United States Patent [19]

Mihaylov et al.

[11] Patent Number: 5,378,262
[45] Date of Patent: Jan. 3, 1995

[54] PROCESS FOR THE EXTRACTION AND SEPARATION OF NICKEL AND/OR COBALT

[75] Inventors: Indje O. Mihaylov, Mississauga; Eberhard Krause, Oakville; Steve W. Laundry, Burlington; Cuong V. Luong, Mississauga, all of Canada

[73] Assignee: Inco Limited, Toronto, Canada

[21] Appl. No.: 216,258

[22] Filed: Mar. 22, 1994

[51] Int. Cl.⁶ .............................................. C01G 51/00
[52] U.S. Cl. ................................................. 75/722
[58] Field of Search ........................................ 75/722

[56] References Cited

U.S. PATENT DOCUMENTS

| | | | |
|---|---|---|---|
| 3,336,133 | 8/1967 | Funatsu et al. | 75/119 |
| 3,907,966 | 9/1975 | Skarbo | 423/139 |
| 3,981,968 | 9/1976 | Miller et al. | 423/139 |
| 4,348,367 | 9/1982 | Rickelton et al. | 423/139 |
| 4,721,605 | 1/1988 | Brown et al. | 423/24 |
| 4,900,522 | 2/1990 | Chou et al. | 423/139 |
| 5,078,900 | 1/1992 | Wegner | 210/728 |

FOREIGN PATENT DOCUMENTS 2098638 12/1993 Canada.

OTHER PUBLICATIONS

Oliver et al., "LIX–65N And Dowfax 2AO Interaction In Copper Solvent Extraction And Electrolysis," (Canadian Metallurgical Quarterly), vol. 15 No. 4 (1976), pp. 383–388.

Cote et a l., "Extraction Liquide–Liquide Du Nickel (II) En Milieu Acide," Industrie Minérale–Mines Et Carriéres–Ies Techniques, Mai 1986, pp. 227–231.

W. A. Rickelton, "Noval Uses For Thiophosphonic Acids In Solvent Extraction," JOM, May 1992, pp. 52–54.

B. K. Tait, "The Extraction Of Some Base Metal Ions By Cyanex 301, 302 And Their Binary Extractant Mixtures With Aliquat 336," Solvent Extraction and Ion Exchange, 10(5), (1992) pp. 799–809.

Sole et al., "Solvent Extraction Characteristics Of Thiosubstituted Organophosphonic Acid Extractants," Hydrometallurgy 30 (1992), pp. 345–365.

B. K. Tait, "Cobalt-Nickel Separation: The Extraction Of Cobalt (II) and Nickel (II) By Cyanex 301, Cyanex 302 and Cyanex 272," Hydrometallurgy, 32 (1993) pp. 365–372.

J. Szymanowski, "Extraction From Systems Containing A Single Metal," Hydroxyoximes and Copper Metallurgy, Section 1, Extraction of Copper, Nickel and Cobalt, (1993) pp. 278–283.

R. G. Bautista, "The Solvent Extraction Of Nickel, Cobalt And Their Associated Metals," vol. 1, The Paul E. Queneau International Symposium, Extractive Metallurgy of Copper, Nickel and Cobalt, (1993) pp. 827–852.

*Primary Examiner*—Peter D. Rosenberg
*Attorney, Agent, or Firm*—Blake T. Biederman; Edward A. Steen

[57] ABSTRACT

The invention provides a hydrometallurgical process for the recovery of metals. In particular, an aqueous feed solution derived from acid leaching is provided. The aqueous feed solution contains nickel and/or cobalt ions. The pH of the solution is maintained at a level between about 2 and 6. The aqueous feed solution is contacted with a water-immiscible organic phase containing an extractant to load the nickel and/or cobalt metal ions to form a metal-bearing organic phase. The extractant has at least one organic soluble dithiophosphinic acid, alkali, alkaline earth metal or ammonium salt thereof. The aqueous feed solution has sufficiently low levels of chromium (VI) ions and copper ions to allow repeated use of the extractant. The metal-bearing organic phase is then separated from the metal-containing aqueous feed solution. Finally, after separation from the aqueous feed solution, the metal-bearing organic phase is contacted with an aqueous strip solution to recover the loaded nickel and/or cobalt from the metal-bearing organic phase.

49 Claims, No Drawings

PROCESS FOR THE EXTRACTION AND SEPARATION OF NICKEL AND/OR COBALT

FIELD OF THE INVENTION

This invention relates to hydrometallurgy, and more particularly to the recovery and separation of nickel and/or cobalt by liquid-liquid extraction from aqueous solutions derived from the acid leaching of ores.

BACKGROUND OF THE INVENTION

In solvent extraction processes, organic phases consisting of an organic extractant, organic diluent, and optionally organic soluble compounds commonly called "phase-modifiers," are contacted with a metal value loaded aqueous phase in a counter-current, cross-current, or co-current fashion over one or more stages. The organic phase is selected in such a way so as to be immiscible with the aqueous phase. Hydrogen ions from the organic phase exchange with metal ions from the aqueous phase so that the organic phase becomes loaded with metal values while the aqueous phase emerges depleted in these metal values. The pH of the aqueous phase is usually controlled to maintain the efficiency and to adjust the metal selectivity of the exchange process. After the extraction, the metal loaded organic phase is contacted with acid in a counter-current, cross-current, or co-current fashion over one or more stages to transfer metal values to the aqueous solution. The metal values from this aqueous solution can then be recovered by various means, for example, by electro-winning.

Effective nickel and cobalt recovery from dilute acidic leach solutions, such as those from leaching lateritic ores, has been known to be possible by precipitation with hydrogen sulfide. When precipitating with hydrogen sulfide, the resulting mixed nickel/cobalt sulfide precipitate may be further refined by operations that optionally may include solvent extraction. Advantageously, solvent extraction is performed on the leach solution directly to bypass the sulfide precipitation step. This direct solvent extraction route eliminates the costs associated with the difficult production and handling of hydrogen sulfide gas and has the potential to directly produce market products.

Direct solvent extraction processes have been commercially applied to recover copper for many years. With respect to cobalt and nickel, solvent extraction has been limited almost exclusively to the refining of intermediate nickel-cobalt products (Bautista, R., "The Solvent Extraction of Nickel, Cobalt, and their Associated Metals." Extractive Metallurgy of Copper, Nickel and Cobalt, vol. I; Fundamental Aspects, R. Reddy and R. Weizenbach (Editors), The Minerals, Metals, and Materials Society, 1993, pp. 827–852). The only exception is for the direct nickel/cobalt recovery from ammoniacal leach liquors as described, for example, in U.S. Pat. Nos. 3,907,966 and 3,981,968.

Attempts to adapt existing solvent extractants for recovery of nickel and cobalt from solutions obtained as a result of direct acid leaching of ores or concentrates using, for example, sulfuric acid have been largely unsuccessful. One main reason is that these solutions typically contain significant amounts of dissolved manganese, magnesium and/or calcium, and these metals are often extracted together with nickel and cobalt. For example, organophosphorus and carboxylic acid extractants extract cobalt and nickel, but also co-extract, often even preferentially, manganese (and to a lesser extent calcium and magnesium). The co-extraction of these metal ions consumes a significant portion of the extractant loading capacity and does not allow the obtaining of pure strip liquors. This eventually renders the extractant commercially unacceptable. Furthermore, excess aqueous solubility is typically a problem for extractants such as carboxylic acids.

Extractants comprising a mixture of carboxylic acids and non-chelating oximes have demonstrated nickel and cobalt selectivity over manganese, magnesium, and calcium. However, the non-chelating oximes usually have high aqueous solubilities and tend to hydrolyse. Chelating hydroxy oxime extractants, such as ketoximes and salicyl aldoximes, most of them commercially developed for the extraction of copper (II) from sulfuric acid leach solutions, have also demonstrated selectivity for nickel and cobalt (II) over manganese, calcium, and magnesium. However, once loaded into these chelating oximes, cobalt (II) tends to oxidize to cobalt (III), which adversely affects stripping and may degrade the oxime reagent. Furthermore, the rate for nickel extraction using chelating oxime extractants has been reported as being very slow (Szymanowski, J., Hydroxyoximes and Copper Hydrometallurgy, CRC Press, 1993, p. 281). Mixtures of chelating hydroxy oximes with di-nonyl naphthalene sulphonic acid (DNNS) have demonstrated improved nickel extraction, however, the DNNS accelerates the degradation of the oxime (Oliver, A. J., and Ettel, V. A., "LIX 65N and Dowfax 2AO Interaction in Copper Solvent Extraction and Electrolysis," CIM 14th Annual Conf., Edmonton, August 1975).

Brown et al., in U.S. Pat. No. 4,721,605 disclose a method whereby the metals selected from the group consisting of zinc, silver, cadmium, mercury, nickel, cobalt, and copper can be separated from calcium and/or magnesium, present in an aqueous solution, by solvent extraction using dithiophosphinic acids Furthermore, B. T. Tait reported in "Cobalt-Nickel Separation: The Extraction of Cobalt (II) and Nickel (II) by Cyanex 301, Cyanex 302, and Cyanex 272," Hydrometallurgy, 32 (1993) pp. 365–372, that Cyanex 301 extractant (Cyanex is a trademark for organophosphorus extractants distributed by Cytec Canada Inc.) extracts both nickel and cobalt and may also be used to selectively remove cobalt from nickel-containing solution. However, the difference in the pH values at which 50% of the cobalt and 50% of the nickel is extracted is a relatively small value of only 1.1 units. In this article, Tait also noted the disadvantage of requiring a strong acid to strip cobalt when using Cyanex 301 extractant. Tait also suggested in "The Extraction of Some Base Metal Ions by Cyanex 301, Cyanex 302 and Binary Extractant Mixtures with Aliquat 336," Solv. Extr. Ion Exch., 10(5) (1992) pp. 799–809, that manganese is also extracted by Cyanex 301 at some higher pH values than nickel and cobalt. Sole et al. in "Solvent Extraction Characteristics of Thiosubstituted Organophosphinic Acid Extractants," Hydrometallurgy, 30 (1992) pp. 345–65, illustrate almost no separation between nickel and cobalt for Cyanex 301. Contrary to Tait, Sole et al. have indicated that Cyanex 301 displays a slight preference for nickel over cobalt.

None of the foregoing discloses a commercially viable process for the selective recovery of metals such as nickel and/or cobalt against metals such as manganese, calcium and magnesium in acidic solutions. The acid leaching of nickeliferous lateritic ores, for example, generates leach solutions containing nickel and cobalt, often combined with appreciable amounts of impurities such as manganese and magnesium. Therefore, a welcome contribution to the art would be a method for the selective solvent extraction of only nickel and cobalt from aqueous solutions containing these metals as well as manganese, magnesium and the like. After the primary separation of nickel and cobalt from other metals by solvent extraction, additional solvent extractants are often required for the separation of nickel from cobalt. A single extractant capable of separating nickel and cobalt from other metals and separating nickel from cobalt would further contribute to the field of nickel and cobalt recovery.

It is an object of the invention to provide a process to selectively recover nickel and/or cobalt values from acidic aqueous solutions using solvent extraction and avoiding the co-extraction of other metal values, present in the same solution, such as, but not limited to, manganese, calcium, and magnesium.

It is a further object of the invention to provide a simple and economical process consistent with the preceding object.

It is a further object of the invention to provide reusable stripped organic phase consistent with one or both of the preceding objects.

It is a further object of the invention to provide separation of nickel from cobalt by their selective stripping from loaded organic phase consistent with one or more of the preceding objects.

It is a further object of the invention to provide separation of nickel from cobalt by their selective loading into an organic phase consistent with one or more of the preceding objects.

SUMMARY OF THE INVENTION

The invention provides a hydrometallurgical process for the recovery of metals. In particular, an aqueous feed solution derived from acid leaching is provided. The aqueous feed solution contains nickel and/or cobalt ions. The pH of the solution is maintained at a level between about 2 and 6. The aqueous feed solution is contacted with a water-immiscible organic phase containing an extractant to load the nickel and/or cobalt metal ions to form a metal-bearing organic phase. The extractant has at least one organic soluble dithiophosphinic acid, alkali, alkaline earth metal or ammonium salt thereof. The aqueous feed solution has sufficiently low levels of chromium (VI) ions and copper ions to allow repeated use of the extractant. The metal-bearing organic phase is then separated from the metal-containing aqueous feed solution. Finally, after separation from the aqueous feed solution, the metal-bearing organic phase is contacted with an aqueous strip solution to recover the loaded nickel and/or cobalt from the metal-bearing organic phase.

DESCRIPTION OF THE PREFERRED EMBODIMENTS OF THE INVENTION

It has been discovered that organic dithiophosphinic extractants may be used to effectively separate nickel and/or cobalt from acid leach solutions by maintaining chromium (VI) and copper ions at levels that allow repeated use of the extractant.

It has further been discovered that nickel/cobalt separation is achieved by extracting nickel and cobalt together with an organic dithiophosphinic extractant and then selectively stripping the co-loaded cobalt from the organic dithiophosphinic extractant with a dilute water-soluble acid solution, while the nickel is subsequently stripped with a more concentrated solution of the same or a different water-soluble acid.

It has further been discovered that nickel/cobalt separation may alternatively be achieved by selectively loading only the nickel onto an organic dithiophosphinic extractant, leaving essentially the cobalt in the aqueous raffinate and then extracting this cobalt with the same or another extractant operating in a separate circuit. After preferential loading, the nickel and cobalt are stripped with solutions of the same or different kind of water-soluble acid from the respectively loaded organic extractant(s).

It has also been discovered that organic dithiophosphinic extractants may be used to effectively separate by solvent extraction nickel and/or cobalt from manganese (II), present in acidic leach solutions of oxide ores. The organic dithiophosphinic extractant readily combines with nickel and cobalt ions in the organic phase, leaving the manganese ions in the aqueous raffinate.

The process of the invention uses a dithiophosphinic extractant to separate nickel and/or cobalt from acidic leach solutions. Specific examples of ores suitable for acid leaching include oxide ores, sulfide ores and manganese or sea nodules that contain nickel and/or cobalt. Most advantageously, the process of the invention is used for lateritic ores.

The leach solution must be maintained at a pH between about 2 and 6 prior to loading of nickel and/or cobalt ions onto the extractant. Advantageously, the leach solution is maintained at a pH between about 3 and 6 prior to loading. Most advantageously, the leach solution is maintained at a pH between about 3 and 5.5 prior to loading. Advantageously, the leach solution is partially neutralized to remove free acid prior to the extraction step. Removing free acid during partial neutralization minimizes or even eliminates the need for base addition during the subsequent solvent extraction operations. During partial neutralization the majority of iron (III), chromium (III), aluminum and copper ions precipitate, leaving a majority of the nickel and cobalt ions in solution. After precipitation, the ions are readily separated from the aqueous feed solution in a solid/liquid separation step. In some cases, it may be desirable to oxidize Fe (II) ions to Fe (III) ions prior to the partial neutralization step. Advantageously, Fe(II) ions are oxidized to Fe (III) ions by contact with an oxygen-containing gas. In some instances, when manganese (IV) ions are present in the leach solution, manganese (IV) ions are also precipitated during partial neutralization. Partial neutralization may be accomplished using any suitable base reagent. Most advantageously, the pH of the leach solution is adjusted with calcium carbonate.

In order to extract nickel and/or cobalt from the leach solution, the solution is contacted with an organic soluble dithiophosphinic acid, alkali, alkaline earth metal or ammonium salt thereof. The dithiophosphinic extractant is advantageously represented by the formula:

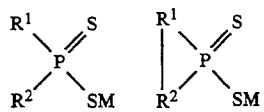

wherein $R^1$ and $R^2$ are the same or different and are substituted alkyl, cycloalkyl, alkoxyalkyl, alkylcydoalkyl, aryl, alkylaryl, aralkyl, or cydoalkylaryl radicals having between 2 and 24 carbon atoms. Most advantageously, $R^1$ and $R^2$ are each 2,4,4-trimethylpentyl radicals; this bis (2,4,4-trimethylpentyl) dithiophosphinic acid is available from Cytec Canada Inc. as Cyanex 301 extractant. The M may be hydrogen, when the extractant is used in its acid form. Alternatively, M may be an alkali, alkaline earth metal ion or an ammonium ion when the extractant is used in its salt form. Most advantageously, M is hydrogen. During solvent extraction, nickel and/or cobalt ions are substituted for M, thus loading the extractant with the metal ions. Extractants are advantageously loaded at temperatures between freezing and 85° C.

During metal stripping, a water-soluble acid solution provides the necessary hydrogen to replace the extracted metal in the M position of the extractant. The extractant, stripped in this manner, is then recycled for repeated loading of nickel and/or cobalt ions.

It has been found that chromium (VI) ions, if present in the feed aqueous solution, will cause a substantial and rapid decrease of the metal extraction ability of the organic dithiophosphinic extractant. Commercially viable operations require repeated use of the extractant. Advantageously, the extractant may be used at least 10 times with only about a 10% or less reduction in extraction ability. Therefore, in order to protect the extractant and optimize its performance during its use over a number of metal extraction and stripping operations, oxidizing species that would not hydrolyze during the partial neutralization step such as, chromium (VI) ions are advantageously removed prior to the solvent extraction with the organic dithiophosphinic extractant. It is recognized that when chromium (VI) concentrations are very low, a chromium (VI) removal step may not be required. The chromium (VI) removal can be accomplished by a variety of techniques. For example, chromium (VI) may be readily removed by reduction and precipitation as chromium (III) during the partial neutralization step. Advantageously, the reductant used for reducing of chromium (VI) ions is a reducing sulfur species such as a metabisulfite, a sulfur dioxide gas or an aqueous soluble sulfide. Alternatively, hydrogen peroxide may be used for chromium (VI) reduction. Most advantageously, sulfur dioxide gas is used for chromium (VI) reduction.

It has been found that copper ions, if present in the feed aqueous solution, bond very strongly to the organic dithiophosphinic extractant. The bond formed between dithiophosphinic extractants and copper ions is so strong that it is virtually impossible to strip the copper with common mineral acids. Therefore, in order to optimize the performance of the extractant, copper ions are advantageously removed prior to the solvent extraction with the organic dithiophosphinic extractant. It is recognized that when copper concentrations are very low, a copper removal step may not be required. This copper removal can be accomplished by a variety of techniques. For example, copper ions may be removed by using an ion-exchange resin. Most advantageously, the ion-exchange resin is a chelating resin with iminodiacetic acid functionality. Other techniques that may be employed for copper removal include, for example, cementation and precipitation as copper sulfide.

The organic dithiophosphinic extractant may be used undiluted. However, it is advantageous to use a water-immiscible organic diluent. This diluent may represent from 1 to 99 parts by volume of the organic extractant-/diluent mixture. Optionally, the organic extractant-/diluent mixture may contain from 1 to 20 pans by volume of one or more additional organic soluble and water-immiscible compounds, denoted generally as "phase-modifiers," which role, among others, is to improve the separation of the aqueous and organic phases.

A broad variety of water-immiscible organic liquids may be used as the diluent. Suitable diluents include, but are not limited to, kerosene, toluene, xylene, naphtha, hexane, decane, cydohexane, and the like. Advantageously, the diluent is an aliphatic or aromatic petroleum product. Most advantageously, the diluent is an aliphatic petroleum liquid. The aliphatic petroleum liquid may optionally contain naphtenic and/or aromatic compounds. Examples of suitable phase-modifiers include, but are not limited to, iso-decanol, tridecyl alcohol, nonyl phenol, tributyl phosphate, trioctyl phosphine oxide, and the like.

For carrying out the solvent extraction process of the invention, mixer-settlers, extraction columns, such as pulse columns, columns with internal stirring using rotating impellers, reciprocating-plate extraction columns, tubular reactors with in-line mixers and the like may be used.

At a steady-state pH of less than about 4, and advantageously of less than about 3, cobalt and nickel are loaded onto the organic dithiophosphinic extractant. Most advantageously, the cobalt and nickel are loaded onto the organic dithiophosphinic extractant at a steady-state pH of less than about 2.5 to ensure that manganese is not co-loaded onto the extractant. If the pH of the aqueous feed is higher than about 2.5, addition of base to neutralize released hydrogen ions during the extraction may not be needed. The avoidance of base addition significantly facilitates minimizing the operational costs of the solvent extraction process. Advantageously, the pH for extraction is higher than about 1.0 to ensure efficient extraction of nickel and/or cobalt. Advantageously, at least about 60% of the nickel ions are loaded onto the extractant. Most advantageously, at least about 95% of the nickel ions are loaded onto the extractant. It has been discovered that a nickel to manganese loading ratio of at least about 100 is readily achievable when at least about 60% nickel is extracted. In fact, separation ratios of at least 400 to 700 are typically achieved with the process of the invention. This exceptional ratio provides for effective nickel and/or cobalt separation from manganese, as well as, calcium, magnesium and the like.

The metal extraction reaction is very fast, thus allowing operation at ambient temperature. However, the extraction may also be carried out at elevated temperatures. Advantageously, the organic/aqueous mixture during extraction is maintained at a temperature between freezing and 85° C. The aqueous to organic phase ratio during extraction is advantageously maintained between 10 and 0.1, more advantageously, between 5 and 0.5, and most advantageously, between 3 and 1.

After loading the organic dithiophosphinic extractant with nickel and cobalt, the said metals can be stripped with a water-soluble acid, separately or together. Cobalt ions advantageously may be separately stripped with aqueous solutions having acidity between about 0.1 and 2.0N, and most advantageously less than 1N HCl, or its equivalent for another acid or combination of acids. After cobalt removal, nickel advantageously may be stripped with the same or a different kind of water-soluble acid with the concentration of the acid being at least 1.0N HCl or its equivalent for another acid or combination of acids. Most advantageously, the acid concentration is between about 2.0N and 8.0N for nickel removal. The metal stripping can be achieved by using, for example, common mineral acids such as sulfuric or hydrochloric acid, and the like, or mixtures thereof. Advantageously, either hydrochloric or sulfuric acid is used. Most advantageously, hydrochloric acid is used for metal stripping. Advantageously, nickel is stripped with the organic phase and aqueous acidic solution being at a temperature between 45° C. and 85° C. Advantageously, the acid strip solutions are internally recycled, within the stripping operation, in order to obtain more concentrated nickel and/or cobalt strip solutions.

Alternatively, nickel and cobalt may be separated by selective loading of nickel over cobalt. Under the conditions close to the maximum metal loading capacity of the organic dithiophosphinic extractant, the nickel ions present in the aqueous feed solution may be loaded onto the extractant by displacing cobalt to the aqueous phase. The organic extractant is thus essentially loaded with nickel only. The cobalt in the aqueous solution may be conveniently extracted using the same or another extractant in a separate extraction step. When using separate cobalt extraction steps, the later cobalt extraction step may require an upward pH adjustment for improved efficiency. The displacement of cobalt by nickel during extraction achieves a nickel/cobalt separation that may be advantageous over the selective nickel/cobalt stripping with different acid concentrations for situations wherein the initial feed concentration of nickel is significantly higher than the concentration of cobalt.

It is advantageous, for economic reasons, to regenerate the acid from the nickel and/or cobalt strip solutions. For example, thermal decomposition of the respective nickel and/or cobalt salts of the strip solutions can be used to produce nickel and/or cobalt oxide and regenerate the acid so that the acid is advantageously recycled for further nickel and/or cobalt stripping.

The following Examples only provide an illustration and should not be construed as limiting the invention in any way, as variations from the invention are possible which do not depart from the spirit and scope of the appended claims.

EXAMPLE 1

This Example illustrates that complete nickel (II) and cobalt (II) extraction is possible, without extracting manganese (II), calcium (II), magnesium (II), or chromium (III), with an organic dithiophosphinic extractant at low pH conditions.

A sample of 15 vol % solution of Cyanex 301 extractant in Isopar M diluent (an aliphatic organic solvent from Imperial Oil) was contacted at a temperature of 23° C. and at various pH values (adjusted with sodium hydroxide solution) for 5 minutes, and at an aqueous to organic (A/O) ratio of 2, with a sulfate solution containing, in g/L, 0.045 copper (II), 3.86 nickel (II), 0.35 cobalt (II), 0.002 iron (III), 2.24 manganese (II), 0.54 calcium (II), 1.54 magnesium (II), 0.094 zinc (II), 0.004 chromium (III) and 0.005 aluminum (III). Samples from each phase were withdrawn after the five minute contact time. The analyzed metal concentrations in the resulting aqueous phase are given in the Table 1a below:

TABLE 1a

| pH | Raffinate Assay (g/L) | | | | |
|---|---|---|---|---|---|
| | Cu (II) | Ni (II) | Co (II) | Mn (II) | Zn (II) |
| 1.46 | <0.001 | 0.410 | 0.040 | 2.28 | 0.001 |
| 1.61 | <0.001 | 0.057 | 0.033 | 2.28 | <0.001 |
| 1.83 | <0.001 | 0.006 | 0.016 | 2.23 | <0.001 |
| 2.01 | <0.001 | 0.002 | 0.008 | 2.19 | <0.001 |
| 2.54 | <0.001 | <0.001 | <0.001 | 2.18 | <0.001 |

The concentrations of Cr (III), Al (III), Ca (II), and Mg (II) remained the same as those in the aqueous feed. The respective percent extractions for Ni(II), Co(II) and Mn(II) are provided in Table 1b below:

TABLE 1b

| pH | Extraction (%) | | |
|---|---|---|---|
| | Ni | Co | Mn |
| 1.46 | 89.4 | 88.6 | 0 |
| 1.61 | 98.5 | 90.6 | 0 |
| 1.83 | 99.8 | 95.4 | 0.4 |
| 2.01 | 99.95 | 97.7 | 2.2 |
| 2.54 | >99.9 | >99.9 | 2.7 |

EXAMPLE 2

This Example illustrates the alternative of selectively loading nickel (II) into an organic dithiophosphinic extractant to achieve an effective nickel/cobalt separation.

i) the selective loading of nickel

A sample of 15 vol % Cyanex 301 extractant in Isopar M diluent was contacted at a temperature of 23° C. for 5 minutes at an A/O ratio of 2 and pH 2.5 (adjusted with sodium hydroxide solution) with a feed sulfate solution containing, in g/L, 0.002 copper (II), 2.15 nickel (II), 0.25 cobalt (II), <0.001 iron (III), 1.18 manganese (II), 0.51 calcium (II), 0.58 magnesium (II), 0.037 zinc (II), 0.020 chromium (III) and 0.007 aluminum (III). After separating the two phases, the aqueous raffinate contained, in g/L, <0.001 copper (II), <0.001 nickel (II), <0.001 cobalt (II), <0.001 iron (III), 1.09 manganese (II), 0.51 calcium (II), 0.56 magnesium (II), <0.001 zinc (II), 0.028 chromium (III) and 0.004 aluminum (III).

The loaded organic phase was then contacted, for a second time, with another portion of the same feed sulfate solution at an A/O ratio of 3 and under otherwise the same conditions. After 5 minutes of contact time, followed by phase separation, the aqueous raffinate phase contained, in g/L, <0.001 copper (II), 0.78 nickel (II), 0.36 cobalt (II), <0.001 iron (III), 1.2 manganese (II), 0.51 calcium (II), 0.58 magnesium (II), <0.001 zinc (II), 0.021 chromium (III) and 0.006 aluminum (III).

The loaded organic phase was then contacted, for a third time, with another portion of the same feed sulfate solution at the same A/O ratio of 3 and the same other conditions. After 5 minutes of contact time, and then phase separation, the aqueous raffinate contained, in g/L, <0.001 copper (II), 2.30 nickel (II), 0.31 cobalt (II), <0.001 iron (III), 1.2 manganese (II), 0.52 calcium (II), 0.59 magnesium (II), 0.005 zinc (II), 0.022 chromium (III) and 0.004 aluminum (III).

Following these three consequent contacts of the same organic phase with fresh portions of the same feed sulfate solution, the obtained loaded organic phase was analyzed and found to contain, in g/L, 0.023 copper, 9.33 nickel, 0.038 cobalt, 0.004 iron, <0.005 manganese and 0.272 zinc.

ii) stripping of nickel

A portion of a similarly loaded organic phase was contacted with 5N hydrochloric acid solution for 40 minutes at a temperature of 55° C. After phase separation, the strip liquor was found to contain, in g/L, <0.001 copper (II), 5.99 nickel (II), 0.03 cobalt (II), <0.001 iron (III), 0.003 manganese (II), 0.002 calcium (II), 0.003 magnesium (II), 0.51 zinc (II), 0.002 chromium (III) and 0.004 aluminum (III).

EXAMPLE 3

This Example illustrates the stripping of nickel and cobalt from loaded organic dithiophosphinic extractant with sulfuric acid.

A sample of 15 vol % Cyanex 301 extractant in Isopar M diluent, loaded to about 7.6 g/L Ni (II), 0.5 g/L Co (II), and 0.12 g/L Zn (II), was contacted with 3.0N sulphuric acid solution at an A/O ratio of 1 at a temperature of 55° C. for 50 minutes. The obtained aqueous strip liquor contained 3.7 g/L Ni (II), 0.5 g/L Co (II), and 0.02 g/L Zn (II), which was equivalent to the stripping of 49% of the nickel, >99.9% of the cobalt, and 15% of the zinc.

EXAMPLE 4

This Example illustrates the complete nickel (II) and cobalt (II) extraction with an organic dithiophosphinic extractant with the simultaneous total rejection of manganese (II), calcium (II), magnesium (II), and chromium (II). This Example further illustrates the separation of nickel (II) and cobalt (II) by selective stripping from the organic dithiophosphinic extractant in a continuous multi-stage counter-current solvent extraction operation.

An aqueous sulfate solution containing, in g/L, 5.05 nickel (II), 0.5.3 cobalt (II), <0.001 iron (III), 2.93 manganese (II), 0.48 calcium (II), 1.03 magnesium (II), 0.074 zinc (II), 0.044 chromium (III) and 0.005 aluminum (III), having a pH of 3.66 at a temperature of 22° C., was contacted in a counter-current fashion in three consequent extraction stages (stages L1, L2, and L3; the aqueous solution enters the operation through stage L3 and leaves the operation (as raffinate) through stage L1) at a flow-rate of 10 mL/min and at a temperature of 41° C. with a 15 vol % solution of Cyanex 301 extractant in Isopar M diluent. The organic solution enters the operation through stage L1 and has the same flow-rate of 10 mL/min to give an A/O ratio of one, with a retention time of 6 minutes per stage. No base was added to any of the extraction stages for pH adjustment or control. The loaded organic solution leaving stage L3 was contacted in a counter-current fashion in two consequent stripping stages (stages C1 and C2) at a temperature of 33° C. with a 1N solution of hydrochloric acid having a flow-rate of 0.8 mL/min to give an organic to aqueous (O/A) ratio of 12.5 (the 1N solution of hydrochloric acid entered the operation through stage C2 and exited the operation (as cobalt strip solution) through stage C1). The organic solution was removed through stage C2 and contacted in a counter-current fashion in one washing stage (stage W1) at a temperature of 32° C. with water, having a flow-rate of 0.5 mL/min to give an O/A ratio of 20. The partially stripped and washed organic phase was contacted, after leaving the washing stage, in a counter-current fashion in four consequent stripping stages (stages N1,N2,N3, and N4) with a 6N solution of hydrochloric acid having a flow-rate of 2.3 mL/min to give an O/A ratio of 4.3 (the 6N solution of hydrochloric acid entered the operation through stage N4 and was removed from the operation as nickel strip solution through stage N1). The stripping stages were maintained at a temperature of 60° C. The metal-stripped organic phase was removed through the N4 stage and was contacted in a counter-current fashion in one washing stage (stage W2) at a temperature of 34° C. with water, having a flow-rate of 0.4 mL/min to give an O/A ratio of 25. The metal-stripped and washed organic phase was then recycled back to the extraction stages (stage L1).

The typical aqueous solution compositions after each stage, along with their pH values where appropriate, are summarized in Table 2.

TABLE 2

| Stage | Temp °C. | pH* | Aqueous Solution Analyses (mg/L) | | | | | | |
|---|---|---|---|---|---|---|---|---|---|
| | | | Ni (II) | Co (II) | Mn (II) | Cr (III) | Ca (II) | Mg (II) | Zn (II) |
| L1 (raffinate) | 41 | 1.30 | 43 | 46 | 3,040 | 52 | 560 | 1,240 | <1 |
| L2 | 41 | 1.53 | 680 | 990 | 3,030 | 52 | 560 | 1,230 | <1 |
| L3 | 40 | 2.36 | 3,510 | 1,630 | 3,050 | 53 | 560 | 1,230 | 3 |
| C1 (cobalt strip liquor) | 33 | 0.28 | 1,960 | 3,730 | 2 | 3 | <1 | 1 | 160 |
| C2 | 33 | 0.23 | 1,260 | 550 | <1 | <1 | <1 | <1 | 110 |
| N1 (nickel strip liquor) | 60 | — | 18,200 | 35 | <11 | 4 | <1 | <1 | 270 |
| N2 | 60 | — | 5,380 | 2 | <1 | <1 | <1 | <1 | <1 |
| N3 | 60 | — | 1,580 | <1 | <1 | <1 | <1 | <1 | <1 |
| N4 | 60 | — | 450 | <1 | <1 | <1 | <1 | <1 | <1 |
| W2 | 34 | 2.36 | <1 | <1 | <1 | <1 | <1 | <1 | <1 |

*Measured at the corresponding temperature.

EXAMPLE 5

This Example illustrates the treatment of a nickel and cobalt containing acidic solution involving the reduction of chromium (VI) with sulfur dioxide gas and partial neutralization.

An aqueous sulfate solution, containing, in g/L, 0.017 copper, 3.29 nickel, 0.33 cobalt, 0.24 iron (III), 2.45 manganese, 0.5 chromium (VI), 0.18 calcium, 0.89 aluminum, 0.079 zinc and 2.44 magnesium, having a pH of about 1.0 and a redox potential of 800 mV, measured against a saturated calomel electrode, was contacted with sulfur dioxide gas at about 60° C. to lower the redox potential to about 550 mV, as measured against a saturated calomel electrode. Following this treatment, calcium carbonate was added to the solution to raise the pH to 4.5 at 60° C. After removing the precipitated solids, the solution contained, in g/L, <0.008 copper, 3.18 nickel, 0.31 cobalt, <0.01 iron, 2.18 manganese, 0.074 chromium (III) (no chromium (VI) was found), 0.89 calcium, 0.01 aluminum, 0.077 zinc, and 2.18 magnesium.

EXAMPLE 6

This Example illustrates that relatively small amounts of copper (II) which may be present in the aqueous feed solution, can be selectively removed prior to solvent extraction by using chelating ion-exchange resins.

An aqueous sulfate feed solution, containing, in g/L, 0.20 copper (II), 3.5 nickel (II), 0.33 cobalt (II), 2.2 manganese (II), 0.5 calcium (II), 1.5 magnesium (II), and 0,087 zinc (II), was fed at an upflow velocity of 1.2 m/h and at a temperature of 23° C. through a column, containing 100 mL of ResinTech SIR-300 chelating resin (from ResinTech, Inc.) with iminodiacetic acid functionality. After the passing of 80 bed volumes of solution, the treated sulfate solution still contained less than 0.001 g/L of copper (II), while the concentrations of nickel (II) and cobalt (II) remained the same as those in the feed solution.

The process of the invention provides several advantages. The invention provides a process to selectively recover nickel and/or cobalt values from acidic aqueous solutions using solvent extraction that avoids the coextraction of manganese, calcium and magnesium. The process of the invention facilitates simple and economical selective recovery of nickel and/or cobalt. The organic phase is typically reusable over many extraction/stripping cycles. The process further provides effective separation of nickel from cobalt by selective stripping or selective loading process options. Finally, base additions during the metal loading step are often not necessary when partial neutralization is used to remove impurities.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A hydrometallurgical process for the recovery of metals comprising the steps of:
   a) providing an aqueous feed solution, said aqueous feed solution being originating from acid leaching and said aqueous feed solution having at least one metal selected from the group consisting of nickel and cobalt ions,
   b) maintaining pH of said aqueous solution at a level between about 2 and 6,
   c) contacting said aqueous feed solution with a water-immiscible organic phase containing an extractant to load metal of said aqueous feed solution onto said extractant and to form a metal-bearing organic phase, said extractant having at least one organic soluble dithiophosphinic acid or alkali or alkaline earth metal or ammonium salt thereof and said aqueous feed solution having sufficiently low levels of chromium (VI) and copper ions to allow repeated use of said extractant,
   d) separating said metal-bearing organic phase from said metal-containing aqueous feed solution, and
   e) contacting said metal-bearing organic phase with an aqueous strip solution to recover said loaded metal from said metal-bearing organic phase.

2. The method of claim 1 including the additional step of removing copper ions from said aqueous feed solution prior to said contacting with said water-immiscible organic phase.

3. The method of claim 1 wherein chromium (VI) ions are removed by reducing with a reductant prior to said contacting with said water immiscible organic phase.

4. The process of claim 1 wherein said organic soluble dithiophosphinic acid or alkali or alkaline earth metal, or ammonium salt thereof is represented by the formula:

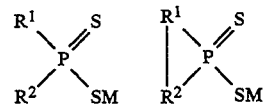

wherein $R^1$ and $R^2$ are selected from the group consisting of substituted alkyl, cycloalkyl, alkoxyalkyl, alkylcydoalkyl, aryl, alkylaryl, aralkyl, or cydoalkylaryl radicals having between 2 and 24 carbon atoms and wherein M is either hydrogen or an alkali or alkaline earth metal ion or an ammonium ion.

5. The method of claim 1 wherein said extractant is bis(2,4,4-trimethylpentyl) dithiophosphinic acid.

6. The method of claim 1 wherein said water-immiscible organic phase includes an organic diluent.

7. The method of claim 1 wherein said aqueous feed solution and said water-immiscible organic phase are contacted at a temperature from above freezing to 85° C.

8. The method of claim 1 wherein said aqueous strip solution contains at least one mineral acid selected from the group consisting of hydrochloric acid and sulfuric acid.

9. The method of claim 1 wherein said metal-bearing organic phase contains nickel and cobalt; and said metal-bearing organic phase is contacted with said aqueous strip solution having a pH less than 2.5.

10. The method of claim 1 wherein said extractant is loaded with nickel ions and cobalt ions; and said contacting said metal-bearing organic phase with an aqueous strip solution includes the steps of contacting said metal-bearing organic phase with a first aqueous strip solution to recover cobalt ions, and separating said first aqueous strip solution from said metal-bearing organic phase, and contacting said metal-bearing organic phase, after said cobalt separation, with a second aqueous strip solution to recover nickel ions from said metal-bearing organic phase and to leave a depleted cobalt/nickel organic phase, and separating said second aqueous strip solution from said depleted cobalt/nickel organic phase.

11. The method of claim 10 wherein said cobalt ions are stripped with said first aqueous strip solution having an acid concentration between about 0.1 and 2.0N and said nickel ions are stripped said second aqueous strip solution having an acid concentration of at least about 1.0N.

12. The method of claim 1 wherein said aqueous feed solution contains nickel and cobalt ions, and said extractant is loaded with nickel and cobalt ions and said loaded cobalt ions are displaced by additional loading of nickel ions from said aqueous feed solution to form a nickel loaded organic phase depleted of cobalt and a cobalt-rich aqueous solution.

13. The method of claim 1 wherein said aqueous feed solution contains nickel and cobalt ions, and said extractant is loaded with nickel and cobalt ions and said nickel and cobalt ions are recovered together during said contact with said aqueous strip solution.

14. The method of claim 1 wherein said metal from said aqueous strip solution is recovered as an oxide by thermal decomposition whereby regenerated acid from said acid aqueous strip solution depleted of metal is recycled to step e).

15. The method of claim 1 wherein said aqueous feed solution contains manganese ions and a majority of said manganese ions are not loaded onto said extractant.

16. A hydrometallurgical process for the recovery of metals comprising the steps of:
   a) providing an aqueous feed solution, said aqueous feed solution being orignating from acid leaching of an ore and said aqueous feed solution having a first metal group ant a second metal group, said first metal group having at least one metal selected from the group consisting of nickel and cobalt ions and said second metal group having at least one metal selected from the group of iron (II), chromium, aluminum and copper ions,
   b) partially neutralizing said aqueous feed solution to a pH between about 2 and 6 to remove free acid front stud aqueous feed solution and to precipitate metals of said second metal group, said neutralizing leaving a majority of ions from said first metal group in said aqueous feed solution,
   c) separating said precipitated metal from said aqueous feed solution,
   d) contacting said aqueous feed solution with a water-immiscible organic phase containing an extractant to load metal of said first metal group onto said extractant and to form a metal-bearing organic phase, said extractant having at least one organic soluble dithiophosphinic acid or alkali or alkaline earth metal or ammonium salt thereof and said aqueous feed solution having sufficiently low levels of chromium (VI) and copper ions to allow repeated use of said extractant,
   e) separating said metal-bearing organic phase from said metal-containing aqueous feed solution, and
   f) contacting said metal-bearing organic phase with an aqueous strip solution to recover said metal of said first metal group from said metal-bearing organic phase.

17. The method of claim 16 including the additional step of removing copper ions from said aqueous feed solution prior to said contacting with said water-immiscible organic phase.

18. The method of claim 16 wherein chromium (VI) ions are removed by reducing with a reductant prior to said contacting with said water immiscible organic phase.

19. The process of claim 16 wherein said organic soluble dithiophosphinic acid or alkali or alkaline earth metal, or ammonium salt thereof is represented by the formula:

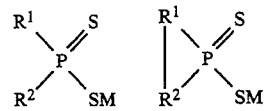

wherein $R^1$ and $R^2$ are selected from the group consisting substituted alkyl, cycloalkyl, alkoxyalkyl, alkylcydoalkyl, aryl, alkylaryl, aralkyl, or cydoalkylaryl radicals having between 2 and 24 carbon atoms and wherein M is either hydrogen or an alkali or alkaline earth metal ion or an ammonium ion.

20. The method of claim 16 wherein said extractant is bis(2,4,4-trimethylpentyl) dithiophosphinic acid.

21. The method of claim 16 wherein said water-immiscible organic phase includes an organic diluent.

22. The method of claim 16 wherein said aqueous feed solution and said water-immiscible organic phase are contacted at a temperature from above freezing to 85° C.

23. The method of claim 16 wherein said aqueous strip solution contains at least one mineral acid selected from the group consisting of hydrochloric acid and sulfuric acid.

24. The method of claim 16 wherein said metal-bearing organic phase contains nickel and cobalt; and said metal-bearing organic phase is contacted with said aqueous strip solution having a pH less than 2.5.

25. The method of claim 16 wherein said extractant is loaded with nickel ions and cobalt ions; and said contacting said metal-bearing organic phase with an aqueous strip solution includes the steps of contacting said metal-bearing organic phase with a first aqueous strip solution to recover cobalt ions, and separating said first aqueous strip solution from said metal-bearing organic phase, and contacting said metal-bearing organic phase, after said cobalt separation, with a second aqueous strip solution to recover nickel ions from said metal-bearing organic phase and to leave a depleted cobalt/nickel organic phase, and separating said second aqueous strip solution from said depleted cobalt/nickel organic phase.

26. The method of claim 25 wherein said cobalt ions are stripped with said first aqueous strip solution having an acid concentration between about 0.1 and 2.0N and said nickel ions are stripped with said second aqueous strip solution having an acid concentration of at least about 1.0N.

27. The method of claim 16 wherein said aqueous feed solution contains nickel and cobalt ions, and said extractant is loaded with nickel and cobalt ions and said loaded cobalt ions are displaced by additional loading of nickel ions from said aqueous feed solution to form a nickel loaded organic phase depleted of cobalt and a cobalt-rich aqueous solution.

28. The method of claim 16 wherein said aqueous feed solution contains nickel and cobalt ions, and said extractant is loaded with nickel and cobalt ions and said nickel and cobalt ions are recovered together during said contact with said aqueous strip solution.

29. The method of claim 16 wherein said metal from said aqueous strip solution is recovered as an oxide by thermal decomposition whereby regenerated acid from said acid aqueous strip solution depleted of metal is recycled to step e).

30. The method of claim 16 wherein said aqueous feed solution contains manganese ions and a majority of said manganese ions are not loaded onto said extractant.

31. The method of claim 16 wherein said aqueous feed solution is neutralized to a pH between about 3 and 6.

32. The method of claim 16 wherein said aqueous feed solution is partially neutralized with calcium carbonate.

33. A hydrometallurgical process for the recovery of metals comprising the steps of:
  a) providing an aqueous feed solution, said aqueous feed solution being originating from acid leaching of lateritic ore and said aqueous feed solution containing chromium (VI) ions and having a first metal group, a second metal group and a third metal group, said first metal group having at least one metal selected from the group consisting of nickel and cobalt ions, said second metal group having at least one metal selected from the group of iron (III), chromium (III), aluminum and copper ions, and said third metal group having at least one metal selected from the group of manganese, calcium and magnesium,
  b) reducing chromium (VI) ions in said aqueous feed solution to chromium (III) ions and partially neutralizing said aqueous leach solution to a pH between about 3 and 6 to, remove free acid from said aqueous feed solution and to precipitate metals of said second metal group, said neutralizing leaving a majority of ions from said first metal group in said aqueous feed solution,
  c) separating said precipitated metal from said aqueous feed solution,
  d) contacting said aqueous feed solution with a water-immiscible organic phase containing an extractant to load metal of said first metal group onto said extractant and to form a metal-bearing organic phase, said extract ant having at least one organic soluble dithiophosphinic acid or alkali or alkaline earth metal or ammonium salt thereof to leave said ions of said third metal group in a resulting raffinate solution and said aqueous feed solution having sufficiently low levels of chromium (VI) and copper ions to allow repeated use of said extractant,
  e) separating said metal-bearing organic phase from said raffinate solution containing said ions of said third metal group, and
  f) contacting said metal-bearing organic phase with an aqueous strip solution to recover said metal of said first metal group from said metal-bearing organic phase.

34. The method of claim 33 including the additional step of removing copper ions from said aqueous feed solution prior to said contacting with said water-immiscible organic phase.

35. The method of claim 33 wherein said chromium (VI) ions are reduced with a sulfur dioxide gas reductant.

36. The process of claim 33 wherein said organic soluble dithiophosphinic acid or alkali or alkaline earth metal, or ammonium salt thereof is represented by the formula:

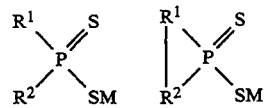

wherein $R^1$ and $R^2$ are selected from the group consisting of substituted alkyl, cycloalkyl, alkoxyalkyl, alkylcydoalkyl, aryl, alkylaryl, aralkyl, cycloalkylaryl radicals having between 2 and 24 carbon atoms and wherein M is either hydrogen or an alkali or alkaline earth metal ion or an ammonium ion.

37. The method of claim 33 wherein said extractant is bis(2,4,4-trimethylpentyl) dithiophosphinic acid.

38. The method of claim 33 wherein said water-immiscible organic phase includes an organic diluent.

39. The method of claim 33 wherein said aqueous feed solution and said water-immiscible organic phase are contacted at a temperature from above freezing to 85° C.

40. The method of claim 33 wherein said aqueous strip solution contains at least one mineral acid selected from the group consisting of hydrochloric acid and sulfuric acid.

41. The method of claim 33 wherein said metal-bearing organic phase contains nickel and cobalt; and said metal-bearing organic phase is contacted with said aqueous strip solution having a pH less than 2.5.

42. The method of claim 33 wherein said extractant is loaded with nickel ions and cobalt ions; and said contacting said metal-bearing organic phase with an aqueous strip solution includes the steps of contacting said metal-bearing organic phase with a first aqueous strip solution to recover cobalt ions, and separating said first aqueous strip solution from said metal-bearing organic phase, and contacting said metal-bearing organic phase, after said cobalt separation, with a second aqueous strip solution to recover nickel ions from said metal-bearing organic phase and to leave a depleted cobalt/nickel organic phase, and separating said second aqueous strip solution from said depleted cobalt/nickel organic phase.

43. The method of claim 42 wherein said cobalt ions are stripped with said first aqueous strip solution having an acid concentration between about 0.1 and 2.0N and said nickel ions are stripped with said second aqueous strip solution having an acid concentration of at least about 1.0N.

44. The method of claim 33 wherein said aqueous feed solution contains nickel and cobalt ions, and said extractant is loaded with nickel and cobalt ions and said loaded cobalt ions are displaced by additional loading of nickel ions from said aqueous feed solution to form a nickel loaded organic phase depleted of cobalt and a cobalt-rich aqueous solution.

45. The method of claim 33 wherein said aqueous feed solution contains nickel and cobalt ions, and said extractant is loaded with nickel and cobalt ions and said nickel and cobalt ions are recovered together during said contact with said aqueous strip solution.

46. The method of claim 33 wherein said metal from said aqueous strip solution is recovered as an oxide by thermal decomposition whereby regenerated acid from said acid aqueous strip solution depleted of metal is recycled to step e).

47. The method of claim 33 wherein said aqueous feed solution contains manganese ions and a majority of said manganese ions are not loaded onto said extractant.

48. The method of claim 33 wherein said aqueous feed solution is neutralized to a pH between about 3 and 5.5.

49. The method of claim 33 wherein said aqueous feed solution is partially neutralized with calcium carbonate.

* * * * *

UNITED STATES PATENT AND TRADEMARK OFFICE
CERTIFICATE OF CORRECTION

PATENT NO. : 5,378,262
DATED : January 3, 1995
INVENTOR(S) : MIHAYLOV et al.

It is certified that error appears in the above-indentified patent and that said Letters Patent is hereby corrected as shown below:

Cover Page, after [73]:, for "Inco Limited, Toronto, Canada" read --Goro Nickel S.A., Noumea, New Caledonia--;
Cover Page, OTHER PUBLICATIONS, line 5, for "et a l." read --et al.--;
Cover Page, OTHER PUBLICATIONS, line 7, for "Carriéres-les" read --Carriéres- Les--;
Cover Page, OTHER PUBLICATIONS, line 8, for "Noval" read --Novel--;
Cover Page, OTHER PUBLICATIONS, line 8, for "Thiophosphonic" read --Thiophosphinic--;
Cover Page, OTHER PUBLICATIONS, line 12, for "302" read --Cyanex 302--;
Cover Page, OTHER PUBLICATIONS, line 16, for "Organophosphonic" read --Organophosphinic--;
Column 2, line 14, for "hydroxy oxime" read --hydroxyoxime--;
Column 2, line 26, for "hydroxy oximes" read --hydroxyoximes--;
Column 2, line 39, for "acids" read --acids.--;
Column 5, line 8, for "alkylcydoal-" read --alkylcycloal- --;
Column 5, line 9, for "clydoalkylaryl" read --cycloalkylaryl--;
Column 6, line 10, for "pans" read --parts--;
Column 6, line 18, for "cydohexane" read --cyclohexane--;
Column 6, line 22, for "naphtenic" read --naphthenic--;
Column 7, line 21, for "C." read --C--;
Column 7, line 28, for "dose" read --close--;
Column 7, line 60, for "cobalt:" read --cobalt--;
Column 7, line 67, for "C." read --C--;
Column 8, line 41, for "C." read --C--;
Column 9, line 28, for "C." read --C--;
Column 9, line 62, for "0.5.3" read --0.53--;
Column 9, line 65, for "C." read --C--;
Column 10, lines 2, 12, 19 and 33 for "C." read --C--;
Column 11, line 3, for "C." read --C--;
Column 11, line 22, for "0,087" read --0.087--;
Column 11, line 23, for "C." read --C--;
Column 11, line 35, for "coextraction" read --co-extraction--;

UNITED STATES PATENT AND TRADEMARK OFFICE
CERTIFICATE OF CORRECTION

PATENT NO. : 5,378,262
DATED : January 3, 1995
INVENTOR(S) : MIHAYLOV et al.

It is certified that error appears in the above-indentified patent and that said Letters Patent is hereby corrected as shown below:

Column 12, line 33, "cydoalkyl" read --cycloalkyl--;
Column 12, line 33, "cydoalkylaryl" read --cycloalkylaryl--;
Column 13, line 27, for "orignating" read --originating--;
Column 13, line 29, for "ant" read --and--;
Column 13, line 33, for "(II)" read --(III)--;
Column 13, line 37, for "front stud" read --from said--;
Column 14, line 12, for "alkylcydoalkyl" read --alkylcycloalkyl--;
Column 14, line 12, for "cydoalk-" read --cycloalk- --;
Column 15, line 30, for "to," read --to--;
Column 15, line 42, for "extract ant" read --extractant--; and
Column 16, line 9, for "cydoalkyl" read --cycloalkyl--.

Signed and Sealed this

Fourth Day of July, 1995

Attest:

BRUCE LEHMAN

Attesting Officer     Commissioner of Patents and Trademarks